TIMING OF REGENERATIVE PULSE REPEATERS

Filed Dec. 11, 1958 3 Sheets-Sheet 1

INVENTORS: F. T. ANDREWS, JR.
E. E. SUMNER
BY Harry C. Hart
ATTORNEY

INVENTORS: F. T. ANDREWS, JR.
E. E. SUMNER
BY Harry C. Hart
ATTORNEY

TIMING OF REGENERATIVE PULSE REPEATERS

Filed Dec. 11, 1958

INVENTORS: F. T. ANDREWS. JR.
E.E.SUMNER

BY Harry C. Hart

ATTORNEY

United States Patent Office 2,992,341
Patented July 11, 1961

2,992,341

TIMING OF REGENERATIVE PULSE REPEATERS

Frederick T. Andrews, Jr., Berkeley Heights, and Eric E. Sumner, North Caldwell, N.J., assignors to Bell Telephone Laboratories, Incorporated, New York, N.Y., a corporation of New York Filed Dec. 11, 1958, Ser. No. 779,731
12 Claims. (Cl. 307—88.5)

This invention deals with pulse transmission and, more particularly, with regenerative repeaters employed in pulse transmission systems.

Communication systems employing pulse transmission are well known and the advantages of such systems have long been realized. The basic problems of accurately converting intelligence, for example voice signals or data, into a train of pulses, transmitting these pulses, and reconstructing the initial intelligence from the pulses at the receiving end have largely been solved, at least to a degree which permits the construction and operation of workable systems.

Problems more difficult of solution have arisen in connection with long distance pulse transmission systems in which the employment of pulse repeaters or pulse regenerators is necessary. Difficulties in this area are centered around the need for faithful reproduction of the initially transmitted pulses at the receiving end in the face of the over-all attenuation, accretion of noise, crosstalk interference, and degradation of shape to which the pulses are subject during the course of transmission. However, various improvements in the art have met the difficulties noted to the extent that pulse transmission is now a potentially primary communications technique.

With the current emphasis on maximum efficient use of channel capacities coupled with a growing need for economic transmission of relatively broad band signals, the frequencies employed in pulse systems are continually being forced upward into the megacycle range. For example, the transmission of television signals by a seven digit pulse code modulation system would require a rate of seventy million pulses per second to produce a picture of good quality. Consequently, the problem of timing now presents a more serious limitation to the future successful development of high frequency pulse transmission and regeneration techniques.

In a high frequency system any excessive pulse "jitter," which may be caused, for example, by noise or other interference, is sufficient to cause pulse displacement on the time scale to the extent that the identities of the transmitted On pulses and Off pulses are lost and reconstruction of the initial intelligence is impossible. Additionally, at the higher frequencies, crosstalk between systems is more severe and is more likely to prevent the recovery of accurate timing information. Thus, timing arrangements employed heretofore, which have been satisfactory for relatively low frequency pulse systems have proved to be inadequate to meet the critical timing needs encountered in the megacycle range.

It is therefore a general object of this invention to increase the accuracy and reliability of pulse transmission.

It is a more specific object of this invention to increase the accuracy of the timing of the operations performed by pulse regenerators.

These and other objects of the invention are realized in a regenerative pulse repeater which employs a basically self-timing arrangement in which a timer, including a tuned circuit, is made responsive to the pulse repetition frequency of the received pulse train. Additionally, in accordance with the invention, the output of the tuned circuit of the regenerator timer is employed to perform two distinct functions. First, and conventionally, the derived timing wave serves as a clock signal for controlling the regenerator. Second, and uniquely, the derived timing wave, or a part of it, is superimposed on the pulse train output of the regenerator so that it becomes a component of the timing signal derived by the timer of the next succeeding regenerator or receiver.

In accordance with another aspect of the invention, which may be employed with particular advantage in a system comprising a transmitting station and a plurality of repeaters in tandem relation, the pulse train is combined initially at the transmitting station with the timing wave which establishes the pulse repetition rate of the pulse generator. Accordingly, the first repeater, and each succeeding repeater in the chain, derives a timing wave from the combination of the pulse repetition rate of the received pulse train and its superimposed timing wave. The derived timing wave is then employed to perform its dual functions as described above.

Among the advantages resulting from a regenerator system in accordance with the invention is the availability of definitive timing information even in those instances where the pulse repetition rate of the pulse train is difficult to derive, for example where there are large gaps or several no-pulse or Off pulse positions between adjacent On pulses.

A further advantage of the invention is that in contrast to conventional pulse transmission systems, the clock or timing signal that controls any particular regenerator is not solely dependent on the signal derived from the basic pulse repetition frequency of the incoming signal but rather is based on a combination of that signal with the timing wave which was initially combined with the pulse train at the preceding repeater. Moreover, this combination of timing wave components bypasses each regenerator in the system and thus remains unaffected by the timing errors that might otherwise be contributed by the pulse regenerators.

Still another advantage which obtains in a system in accordance with the invention is that the power of the timing wave may be relatively low compared to a system employing a timing wave transmitted over a separate channel as the sole source of timing control for the regenerators.

The invention is not restricted to any particular type of combination between the pulse train output and the timing wave but instead may take various forms both with respect to the degree of combination effected and to the circuitry employed. For example, in one form of the invention the complete timing wave is combined with the pulse train output. More specifically, a positive half-cycle is added at each pulse position, whether or not a pulse is present, and a negative half-cycle is added at each space or between-pulse position. Between the output of the timer and the output of the regenerator this form of the invention employs a resistance-capacitance coupling circuit. Before being applied to the coupling circuit, the timing wave is amplified by two amplifying stages, each comprising a transistor in common-emitter configuration. A feedback path is provided between the emitter of the output transistor and the base of the input transistor. Timing wave output both for controlling the operation of the regenerator and for combining with the pulse train output is taken from the collector of the output transistor of the clock amplifier.

In another form of the invention, only a part of the timing wave is combined with the pulse train output. Specifically, timing information is added only when an Off pulse occurs. At each Off pulse position the top or positive half-cycle of the timing wave is combined with the pulse train and, as a result, a supplement to the discrete timing information is provided only where it is most needed, that is to say, in intervals where no signal pulses appear. The advantageous partial combination of the timing wave with the pulse train is achieved through the use of a particular coupling circuit which serves an additional useful function, namely, isolation of the clock circuit and its amplifier from the backward acting reaction of outgoing pulses. Moreover, since timing information is not added during On pulses, these pulses are not distorted in form but instead retain their characteristic squared tops. In this form of the invention the output of the timer is taken from the emitter of the output transistor of the clock amplifier and is coupled to the output circuit of the regenerator through a capacitor and an asymmetrically conducting impedance device or diode. Although the emitter of the output transistor is in the clock amplifier feedback path, the diode provides a high degree of isolation between the clock circuit and the backward-acting reaction from the On pulses of the regenerator output. This form of the invention is particularly suitable in applications which require a substantial degree of isolation between outgoing On pulses and the timing circuit in order to ensure timing wave accuracy and corresponding signal quality. An example of this type of application is a pulse code modulation system for the transmission of voice signals.

The regenerative pulse repeater shown as a specific embodiment of the invention comprises an input transformer coupled to an equalization circuit which employs two constant resistance networks in tandem in order to provide a good termination for both the line and the amplifier throughout the frequency band. The output of the equalization network is applied to a preamplifier which comprises three transistors in common-emitter configuration with over-all shunt-shunt feedback. A certain amount of shaping is provided in order to achieve stability against oscillation. At the output of the preamplifier, direct-current restoring action is achieved by means of a coupling capacitor and a diode clamp.

The output of the preamplifier is applied to both the regenerator and the timer. The timer comprises a tuned circuit employing an inductor with a ferrite core. Sufficient air gap is provided to stabilize the inductance against effects of temperature or aging. A degree of isolation is provided between the tuned circuit and the signal path to prevent both detuning effects and signal loading effects. The additional gain of two transistors is employed in the output path from the tuned circuit to provide energy to control the regenerator and to provide energy to control the regenerator and to provide a signal of suitable power for combination with the output pulse train.

The regenerator is a single-transistor blocking oscillator circuit with a natural period considerably longer than the normal pulse interval. An input gating arrangement is provided to turn the regenerator on under the joint control of the signal and the transistor clock and off under the sole control of the clock.

One feature of the invention, therefore, is the control of the timing of a pulse regenerator by means of a timing wave derived from the discrete timing information of the pulse repetition frequency of the regenerator pulse train input and a superimposed timing wave.

An additional feature of the invention is the dual employment of a timing wave to control the action of a pulse regenerator and to supplement the discrete timing information in the pulse train output of the regenerator.

A complete understanding of this invention together with additional objects and features thereof will be gained from a consideration of the following detailed description and accompanying drawings of an illustrative embodiment in which.

Figure 1A:
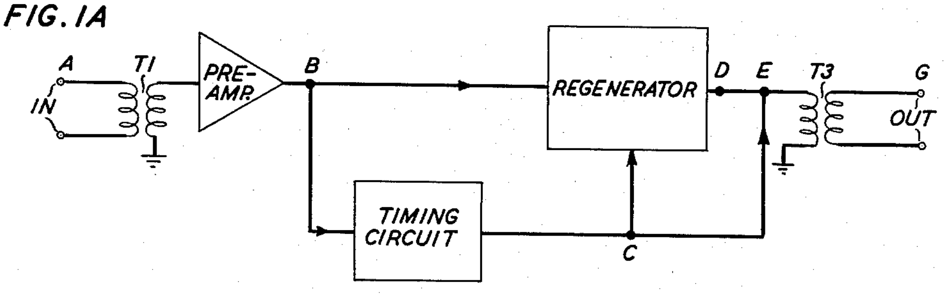
FIG. 1A is a block diagram of a regenerative pulse repeater in accordance with the invention and FIG. 1B is a block diagram of a pulse transmission system in accordance with the invention.

FIG. 1A shows the basic circuit of a regenerative pulse repeater, in accordance with the invention, including a preamplifier, with input provided by the secondary of an input transformer T1. A pair of paths is established at junction point B, one of which introduces the amplified input signal to the regenerator, and the other of which applies the amplified input signal to the timing circuit. The junction point C marks a second pair of conducting paths, one leading to the regenerator and the second CE leading to the output of the regenerator which serves to combine the derived timing signal with the regenerated pulse train output. In an alternate form of the invention timing wave is reversed in phase at the timing circuit output. In this form of the invention, which is discussed below in detail in connection with FIG. 2, phase coincidence between the regenerator output and the timing wave is achieved by applying the two signals to opposite terminals of the primary of the output transformer T3.

Figure 1B:
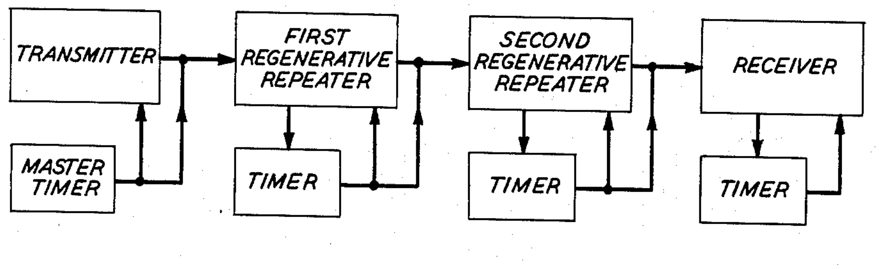

FIG. 1B illustrates how the principles of the invention may be employed advantageously in each link of an entire pulse transmission system. The master timer or clock circuit that controls the timing of the pulse generator at the transmitting station also supplies a timing wave which is applied to or combined with the transmitter's pulse train output. The first and second regenerative repeaters perform as the regenerative repeater shown in FIG. 1A and described above. The receiver functions in a similar manner with the exception that there is of course no pulse train output from the receiver and hence no requirement for the further addition of timing information.

Figure 4:
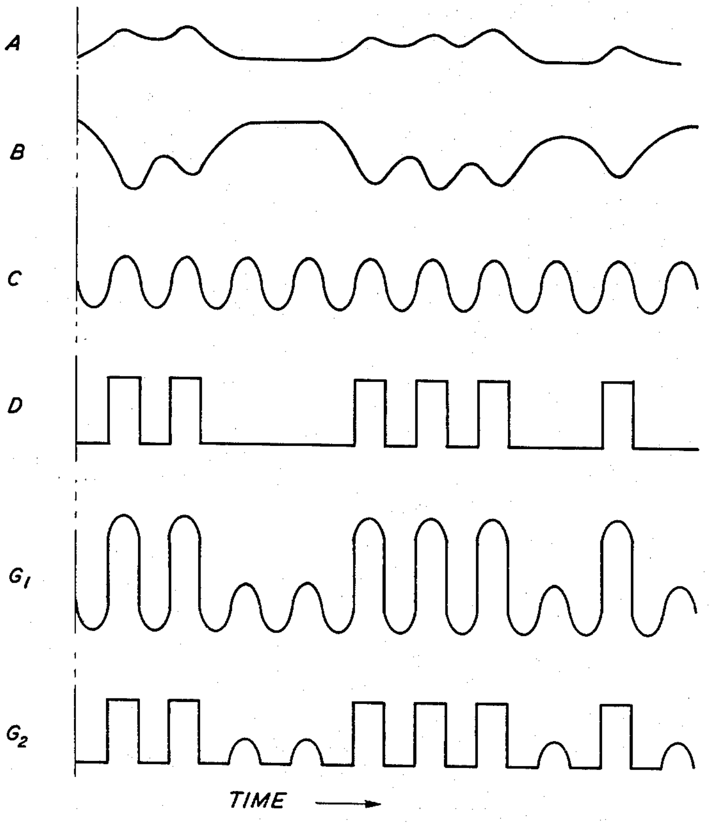
FIG. 4 is a family of wave forms on a common time scale tracing the path of a signal through the circuits shown by FIGS. 1A, 2, and 3.

Each of the wave forms shown in FIG. 4 represents the signal present at the correspondingly designated point in FIG. 1A. Accordingly, the signal at point A in FIG. 1A is the degraded, attenuated, and distorted pulse train shown in curve A of FIG. 4. At point B in FIG. 1A the signal has been amplified, equalized, and inverted and, as evident from curve B of FIG. 4, the pulses can be identified substantially more readily than at point A. The signal at point C of FIG. 1A, representing the output of the timing circuit, is a characteristic sinusoidal timing wave, as shown in curve C, with a frequency equal to the pulse repetition rate of the pulse train input. The regenerator, operating under the combined influence of the equalized, amplified, and inverted pulse train signal from point B and the timing wave from point C, generates a pulse train output at point D as shown in curve D of FIG. 4. The only timing information in the pulse train of curve D is that which is inherent in its pulse repetition rate.

As noted above, one form of the invention calls for the addition of the complete timing wave to the pulse train output. Curve $G_1$ of FIG. 4 illustrates a combined signal of this type as it would appear at output point G of FIG. 1A. A second form of the invention calls for only partial addition of the timing wave to the pulse train. As evident from curve $G_2$, this form of the invention adds a positive half-cycle of the timing wave at each Off pulse position. In either form of the invention illustrated by curves $G_1$ and $G_2$, or in other forms of the invention employing various degrees of combination between the timing wave and the pulse train, each repeater in a tandem-arranged chain of repeaters employs a timing wave derived from a combination signal rather than a timing wave from an independent source or one derived solely from the pulse repetition rate of the pulse train.

Figure 2:
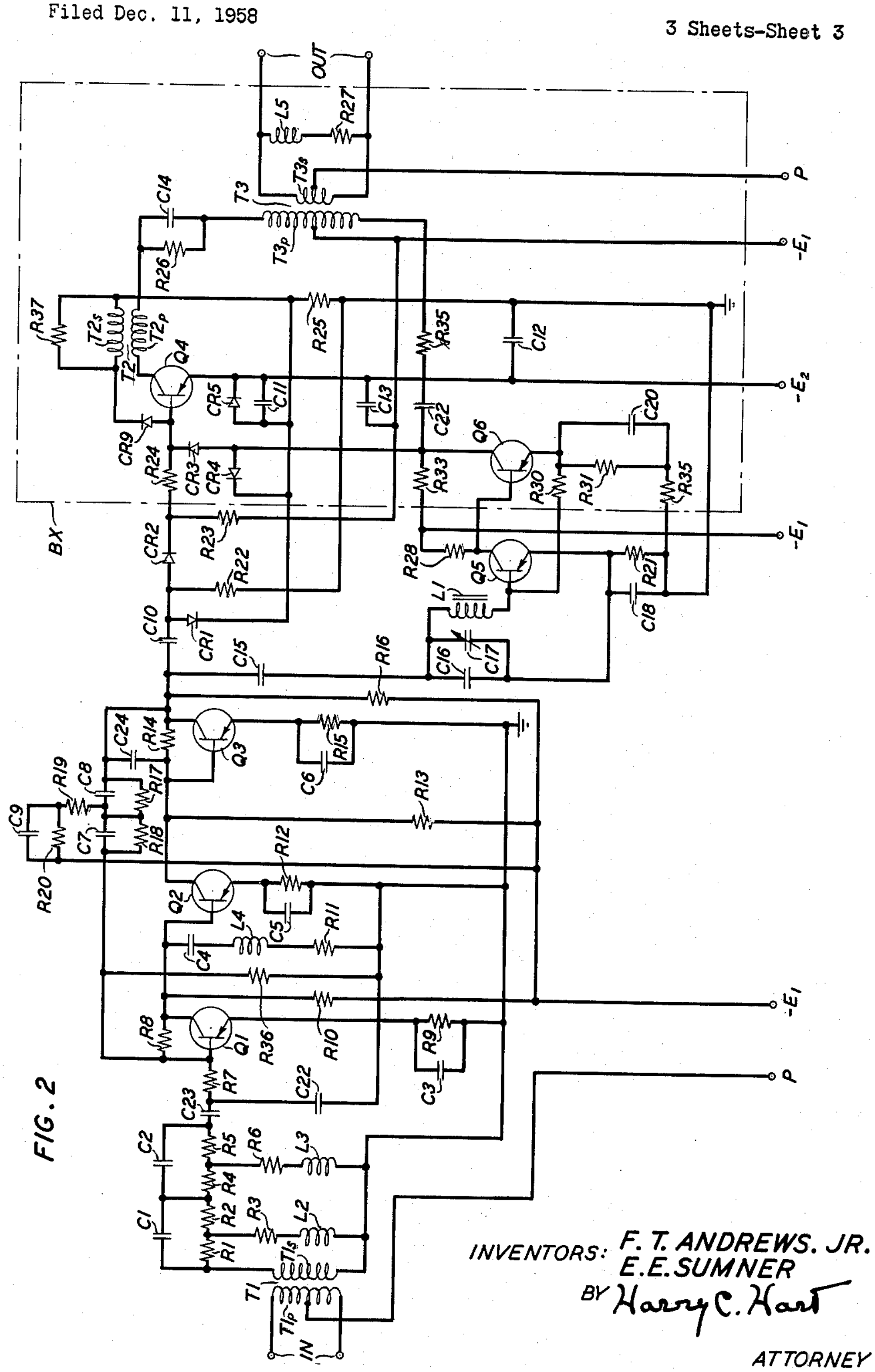
FIG. 2 is a schematic circuit diagram of the arrangement shown in FIG. 1A.

Turning now to a more detailed consideration of a pulse repeater in accordance with the invention as shown in FIG. 2, input to the system is through the primary $T1_p$ of the input transformer T1. This transformer performs the dual function of impedance matching and of converting from a balanced signal on the line to an unbalanced signal. The transformer secondary $T1_s$ has a straight-through connection to an equalizer circuit comprising resistors R1, R2, R3, R4, R5, and R6, capacitors C1 and C2, and inductors L2 and L3. These circuit elements are connected in two bridged-T constant-resistance sections which compensate for the frequency characteristics of the transmission line, which may be, for example, a paper-insulated pair. The particular system shown is designed to match a 6000-foot length of cable. When shorter lengths are encountered, it is necessary to modify the equalization circuit shown by inserting additional bridged-T sections. In this fashion it is possible to build out any length of line to look electrically the same as 6000 feet.

The output of the equalizing network is applied to a preamplifier comprising three transistors, Q1, Q2, and Q3, each in common-emitter configuration. Specifically, the output of the equalizing network is coupled to the base of the first transistor Q1 through capacitor C23 and resistor R7. A degree of band shaping, particularly in the region above the pulse repetition rate, is provided by capacitor 22. Emitter bias for transistors Q1, Q2, and Q3 is provided through resistors R9, R12, and R15, respectively, with their associated by-pass capacitors C3, C5, and C6. Collector bias for transistors Q1, Q2, and Q3 is provided from the negative potential source $-E_1$ through resistors R10, R13, and R16, respectively. In order to stabilize the gain and to produce a very low output impedance, the preamplifier is provided with negative feedback by the network comprising resistors R17, R18, R19, and R20 and capacitors C7, C8, and C9. The resistor R8 provides local feedback between the collector and the base of transistor Q1 and a similar function for transistor Q3 is provided by resistor R14 and capacitor C24. Additional band shaping for the high frequency region in the feedback path is accomplished by means of capacitor C24 and resistor R12. Capacitor C4, inductor L4, and resistor R11 are employed to obtain proper gain and phase margins in the preamplifier circuit. The pass band of the preamplifier is essentially flat up to the pulse repetition rate which, in the particular embodiment shown, is approximately 1.544 megacycles.

The output of the preamplifier is taken from the collector of transistor Q3 and applied to two conducting paths. Considering first the path leading to the timer or clock circuit, the signal is coupled through capacitor C15 to the tuned circuit comprising an inductance L1, a capacitor C16, a trimming capacitor C17, and the base emitter path of transistor Q5. The tuned circuit is tuned to the pulse repetition rate and, in the form of the invention illustrated, is energized by the combination of that component in the spectrum of the received pulse train whose frequency is the pulse repetition rate and the sinusoidal timing wave which was superimposed on the pulse train at the initial transmitting station or at the preceding pulse repeater.

The oscillatory voltage of the tuned circuit is amplified successively by transistors Q5 and Q6. Emitter bias for transistors Q5 and Q6 is provided by resistors R21 and R31, respectively, together with their associated by-pass capacitors C18 and C20. Collector bias for transistors Q5 and Q6 is from the negative power supply $-E_1$ through resistors R28 and R33, respectively. The clock amplifier employs a feedback circuit including resistor R30 connected between transistor Q6 and transistor Q5. Since the feedback path is from the emitter of transistor Q6 to the base of transistor Q5, the feedback is negative or out of phase with the tuned circuit output and hence acts to stabilize the amplifier gain. Additionally, since the feedback path is effectively in shunt, the input impedance of the clock amplifier is low and it can be connected directly in series with inductance L1 without appreciably reducing the Q of the tuned circuit.

As explained in greater detail below in connection with the discussion of the functioning of the regenerator, proper regenerator operation requires that the pulses applied to the regenerator input be in phase coincidence with the clock signal which controls the timing of the regenerator. From a consideration of the circuitry shown in FIG. 2, it is evident that the required phase coincidence is achieved. Specifically, On input pulses are positive when received. On pulses in the preamplifier circuit output are negative-going as a result of the odd number of transistors employed, namely, Q1, Q2, Q3, and the attendant odd number of phase reversals that occur. Negative-going On pulses are thus applied both to the regenerator and to the clock circuit. Two phase reversals take place in the clock circuit by virtue of the two transistors Q5 and Q6 and hence the clock signal on the collector of Q6 is in phase coincidence, as required, with the negative-going On pulses applied to the regenerator.

In the interest of presenting a logical, sequential picture of the over-all operation of the circuit, a specific description of the circuitry between the collector of Q6 and the output transformer T3 will be deferred until after the pulse regenerator itself has been considered in detail. Capacitor C10 in conjunction with diode CR1 performs a direct-current restoration function. Whenever the signal at the junction of these two elements tends to go positive relative to the diode bias, diode CR1 conducts, building up charge on the capacitor, thereby restoring the potential of the base line of the pulse train to the proper level. Hence, the signal at that point consists of a series of negative-going pulses with the positive excursion or base line clamped at a predetermined potential. The clamp potential relative to the emitter of the blocking oscillator, transistor Q4, is determined by diode CR5, which is forward-biased by the current through resistor R25. A limited amount of control of the clamp level can be obtained by selecting the magnitude of resistor R25 which in turn determines the amount of current carried by diode CR5.

The resistors R22, R23, and diode CR2 comprise a current gating arrangement. Current flows from the positive side of the supply, or ground, through resistor R22, diode CR2, and resistor R23 to the negative side of the supply, $-E_1$. In the absence of any other connections to this divider, the voltage to the anode of diode CR2 is slightly positive with respect to the clamp voltage produced by diode CR5. The connection between the divider and diode CR1 therefore holds the junction of diodes CR1 and CR2 at the clamp bias. The application of a negative pulse from the preamplifier, that is to say, from the collector of transistor Q3, serves to back-bias both diodes CR1 and CR2. Under this condition, resistor R23 draws current through resistor R24 either from the base of transistor Q4 or from the collector of transistor Q6 through the clock diode CR3.

The positive excursions of the normally sinusoidal wave form on the collector of transistor Q6 are clamped by diode CR4 to the clamp voltage discussed above. So long as the clock signal is positive, current flows through the diode CR3, resistor R24, and resistor R23 to the negative supply source $-E_1$ and no current will be drawn from the base of transistor Q4. When the clock signal goes negative, however, diodes CR4 and CR3 are both back-biased and consequently the current path is in effect opened at the junction of these two diodes. Thus, all of the current drawn by resistor R23 must come from the base of transistor Q4, and triggering of that transistor is initiated thereby. The phase relationship between negative input pulses and the clock signal is such that the clock signal goes negative at about the time of the occurrence of the negative-going peak of the input pulse. Evidently then, there is an "AND" logic function between these two signals and the presence of both an input pulse and a negative excursion of the timing wave results in a controlled amount of current being drawn from the base of transistor Q4.

Current at the base of transistor Q4 causes an amplified current to flow in the collector circuit which includes the primary $T2_p$ of the feedback transformer T2, the compensating network comprising resistor R26 and capacitor C14, and theprimary $T3_p$ of the output transformer T3. Voltage induced in thesecondary $T2_s$ of transformer T2 is in a direction to further increase the current in the base.

Current in the collector and base circuits continues to build up until transistor Q4 goes into saturation. At this point, the collector and emitter voltages are substantially equal and the transistor acts as a closed switch. Since, in the particular embodiment shown, voltage at the collector of transistor Q4 relative to its emitter is initially at approximately −6 volts, the switching action results in a 6-volt pulse being applied to the collector circuit. Substantially all of this voltage drop occurs across the primary $T3_p$ of output transformer T3. A two-to-one turns ratio in the output transformer results in a pulse of approximately 2.6 volts being applied to the line.

Considering the regeneration process in more detail, the output pulse from transistor Q4 continues until such time that the clock voltage again goes positive. At that point, the clock signal diverts the feedback current from the base of transistor Q4 to the clock circuit which in turn causes the turn-off of transistor Q4. It should be noted at this point that transistor Q4 remains saturated, once it has been triggered, by virtue of the feedback current and consequently the input can be removed without causing the transistor to turn off. It is evident, therefore, that the duration of the pulse produced at the output is a function only of the length of time that the clock signal remains negative.

In the case of a long string of pulses, magnetizing current builds up in the output transformer T3. The action of this current is to produce a negative swing following each positive pulse so that the average voltage is maintained substantially at zero. In the worst case, this action would effectively double the pulse height if no corrective action were taken. The function of the compensating network, comprising resistor R26 and capacitor C14, is to build up a charge across capacitor C14 which, in effect, subtracts from the supply voltage, reduces the magnitude of the positive pulse applied to transformer T3, and maintains the pulse amplitude at a constant level. To achieve this result, the time constant of capacitor C14 and resistor R26 must match the time constant of the secondary inductance of transformer T3 and its load resistance. Difficulty is encountered if the load presented to the transformer is not purely resistive, as it usually is not when the termination is a cable pair. The inductance L5 in series with resistor R27 approximately compensates for the frequency characteristic of the impedance of the cable to make it resistive across the entire band of interest.

Turning again to the clock amplifier, the collector of transistor Q6 is also coupled to the lower terminal of the primary $T3_p$ of output transformer T3 through capacitor C22 and resistor R35. It is this coupling path that effects a combination between the output of the timer and the output of the regenerator. Although, as noted above, the signal on the collector of transistor Q6 is in phase coincidence with the On pulses applied to the regenerator, the clock signal is in phase opposition to the output pulses from the regenerator as a result of the phase reversal that takes place in the single transistor Q4. The phase coincidence required for combining the two signals is achieved by applying the regenerator output to the upper terminal of the secondary winding of the output transformer T3 and by applying the clock signal to the lower terminal of that winding, as shown.

In any such system some degree of isolation must be provided between the circuit of the output transformer and the clock amplifier. In the arrangement shown, the timing wave output is taken from the collector of transistor Q6, rather than from the emitter which is in the feedback path, and hence a properly selected value of the resistor R35 affords a sufficient degree of isolation between the backward acting reaction of outgoing On pulses and the clock amplifier.

Figure 3:
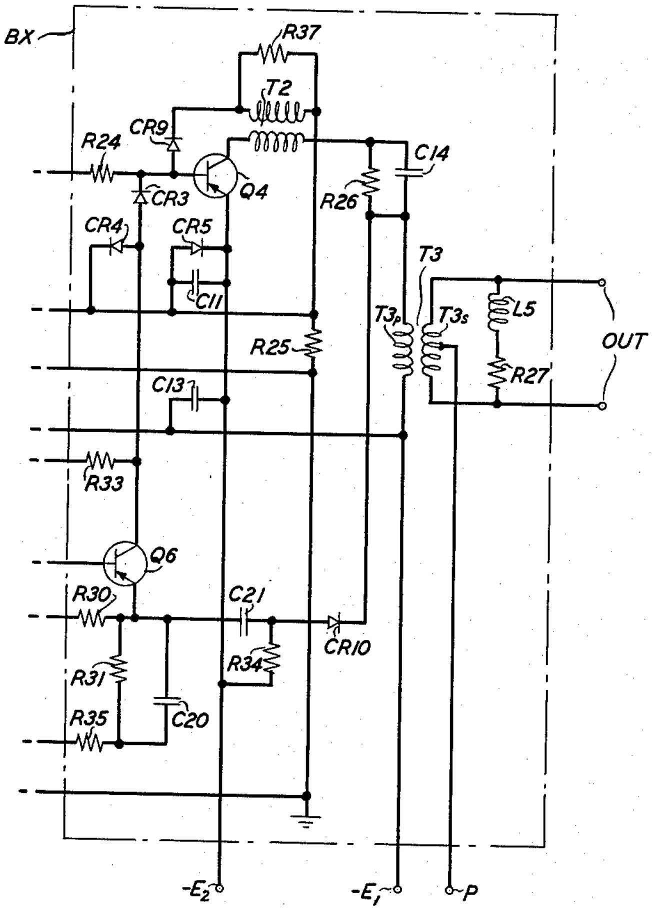
FIG. 3 is a schematic diagram of an alternative to the arrangement of FIG. 2.

The circuitry included in the dotted line box BX of FIG. 2 has been reproduced with certain modifications to illustrate another form of the invention and is shown as FIG. 3. In FIG. 3 there is no connecting path between the collector of Q6 and the output transformer. Instead, the timing wave signal is taken from the emitter of transistor Q6. It will be recalled that the signal on the collector of Q6 is in phase oppositon to the On output pulses of the regenerator. Accordingly, the signal on the emitter is in phase coincidence with the regenerator output, phase reversal of the timing wave is not required, and both signals may be applied to the upper terminal of the primary winding of the output transformer T3, as shown. In this form of the invention only a part of the timing wave is added to the pulse train, specifically, positive half-cycles which appear only at Off pulse positions as illustrated by curve $G_2$ of FIG. 4. This partial timing wave addition is in contrast to the full timing wave addition, illustrated by curve $G_1$ of FIG. 4, which is achieved by employing resistance-capacitance coupling between the collector of transistor Q6 and the output transformer T3.

Considering now in detail the operation of the circuit of FIG. 3, the connecting path between the emitter of Q6 and the output transformer includes capacitor C21 and diode CR10. Diode CR10 and resistor R34 act to clamp the junction of these two elements at the extreme negative excursion of the voltage on the output transformer T3, which is the base line of the outgoing pulse train. It is only in the absence of output pulses on the primary $T3_p$ of the output transformer T3 that the signal from the clock amplifier is superimposed on the base line of the pulse trains. Whenever a pulse is applied to the primary winding $T3_p$, diode CR10 is back-biased. This biasing provides excellent isolation or protection for the clock circuit from any backward acting reaction from outgoing On pulses and incidentally prevents timing information from being added to the pulse train during On pulses.

Further examination of the circuitry illustrated in FIG. 4 shows that timing information is added to the pulse train output only on positive excursions of the clock signal. In effect, the capacitor C21 sees a nonlinear load which is a low impedance through diode CR10 during positive swings of the timing wave. During negative excursions of the clock, the load is a relatively high impedance comprising resistor R34.

During the positive swing of the timing wave, the charge built up on capacitor C21 cannot exceed the charge that was taken off during the negative swing. Accordingly, the amount of signal introduced at the output is an inverse function of the magnitude of resistor R34. The proper resistance for a particular circuit application is of course determined by the over-all requirements of the system.

Aside from the connecting path between transistor Q6 and output transformer T3, the circuitry shown in FIG. 3 is identical to that shown in FIG. 2 and is included in FIG. 3 merely for convenience of reference.

It is to be understood that the above-described embodiments are only illustrative of the principles of the invention. Numerous other arrangements may be devised by those skilled in the art without departing from the spirit, scope, and teaching of the invention.

What is claimed is:

1. In a pulse regenerator, in combination, means for receiving an input signal of On and Off pulses combined in preassigned phase relation with a first timing wave, means for deriving a second timing wave from said input signal, means jointly responsive to said input pulse train and to said second timing wave for generating an output pulse train with each output pulse corresponding to an associated input pulse, and means for combining at least a part of said second timing wave with said output pulse train.

2. Apparatus as defined in claim 1 wherein said deriving means comprises a tuned circuit.

3. Apparatus as defined in claim 2 wherein said generating means comprises a blocking oscillator.

4. Apparatus as defined in claim 1 including means rendering said generating means jointly responsive to each of said On input pulses and to said second timing wave for the initiation of the generation of a corresponding On output pulse and responsive only to said second timing wave for the termination of the generation of said corresponding On output pulse.

5. Apparatus as defined in claim 1 wherein said first and second timing waves are substantially sinusoidal and wherein said part of said second timing wave comprises only positive excursions of said wave occurring in phase coincidence with Off output pulses.

6. In a self-timed regenerative repeater including a pulse regenerator, means for receiving a train of pulses to be repeated, means for deriving from said received pulses a timing wave at a frequency equal to the pulse repetition frequency of said received pulse train, means including said pulse regulator responsive to said received pulses and to said timing wave for producing regenerated output pulses, and means for combining at least a portion of said timing wave with said regenerated output pulses.

7. A pulse transmission system for transmitting a train of On and Off pulses comprising a transmitting station and a plurality of pulse repeaters in tandem relation, said transmitting station comprising means for the generation of said pulse train, means for generating a first timing wave for establishing the pulse repetition rate of said pulse train, and means for combining said timing wave with said pulse train; each of said pulse repeaters comprising means for receiving a combination of pulses to be repeated and a timing wave in preassigned phase relation, means for deriving a second timing wave from said combination, means responsive to said received pulses and to said second timing wave for regenerating said received pulses, and means for combining said second timing wave with said regenerated pulses.

8. In a pulse regenerator including a regenerator output circuit, means for receiving an input signal, said signal being characterized by a train of On and Off pulses combined with a first timing wave, means for deriving a second timing wave from said input signal, means including an output point responsive to said input pulse trains and to said second timing wave for regenerating said input pulses, an output transformer comprising a primary and a secondary circuit coupling said regenerator output circuit to said output point, means for applying regenerated pulses to said primary circuit whereby magnetizing current capable of affecting the height of said regenerated pulses is built up in said transformer, said applying means including means for balancing out the effect of said magnetizing current on the height of said regenerated pulses, and means connecting said timing wave-deriving means to the primary of said transformer whereby at least a part of said timing wave is combined with said regenerated pulses.

9. In a pulse regenerator, in combination, means for receiving an input signal, said signal comprising a train of On and Off pulses combined with a first substantially sinusoidal timing wave in phase coincidence with said pulses, means for deriving a second timing wave from said input signal in phase coincidence with said first timing wave, means jointly responsive to said input pulse train and to said second timing wave for generating an output pulse train in phase opposition to said input pulse train when said input pulse train and said second timing wave are applied to said generating means in phase coincidence, means for inverting the phase of said second timing wave into phase coincidence with said output pulse train, and means for combining said second timing wave with said output pulse train.

10. In a pulse regenerator, in combination, means for receiving an input signal, said signal comprising a train of On and Off pulses combined with a first substantially sinusoidal timing wave, said pulses being in phase coincidence with said first timing wave, means for deriving a second and a third timing wave from said input signal, said second timing wave being in phase coincidence with said first timing wave and in phase opposition to said third timing wave, means jointly responsive to said input pulse train and to said second timing wave for generating an output pulse train in phase opposition to said input pulse train when said input pulse train and said second timing wave are applied to said generating means in phase coincidence, whereby said output pulse train is in phase coincidence with said third timing wave, and means for combining with said output pulse train only the positive-going peaks of said third timing wave occurring in phase coincidence with the Off pulses of said output pulse train.

11. In a pulse regenerator including an input point and an output point, means including said input point for receiving an input train of On and Off pulses, said train being characterized by a particular pulse repetition rate, means for deriving a timing wave at a frequency integrally related to said pulse repetition rate, means responsive to said input pulse train and to said timing wave for regenerating said input pulse train into a corresponding output pulse train, means for applying said output pulse train to said output point, and means for applying at least a part of said timing wave to said output point, said last named means including an amplifier having at least one transistor with collector, base and emitter electrodes and means connecting the emitter of said transistor to said output point through a capacitance and an asymmetrically-conducting impedance device in series relation, whereby the part of said timing wave combined with said output pulse train includes only excursions of a single polarity occurring in phase coincidence with the Off pulses of said output pulse train.

12. In a pulse regenerator including an input point and an output point, means including said input point for receiving an input train of On and Off pulses, said train being characterized by a particular pulse repetition rate, means for deriving a timing wave at a frequency integrally related to said pulse repetition rate, means responsive to said input pulse train and to said timing wave for regenerating said input pulse train into a corresponding output pulse train, means for applying said output pulse train to said output point, and means for applying said timing wave to said output point, said last named means including an amplifier having at least one transistor with collector, base and emitter electrodes, and means connecting the collector of said transistor to said output point through a capacitance and a resistance in series relation whereby said entire timing wave is combined with said output pulse train.

References Cited in the file of this patent

UNITED STATES PATENTS

| | | |
|---|---|---|
| 2,422,204 | Meacham | June 17, 1947 |
| 2,669,706 | Gray | Feb. 16, 1954 |
| 2,738,463 | Metzger | Mar. 13, 1956 |